Patented Feb. 9, 1943

2,310,374

UNITED STATES PATENT OFFICE 2,310,374

POLYMERIZATION OF ROSIN AND ROSIN ESTERS

Alfred L. Rummelsburg, Wilmington, Del., assignor to Hercules Powder Company, Wilmington, Del., a corporation of Delaware No Drawing. Application December 18, 1940, Serial No. 370,668

16 Claims. (Cl. 260—97)

This invention relates to the polymerization of rosin and rosin esters.

Rosin or rosin esters have heretofore been polymerized with various polymerizing agents or catalysts such as sulfuric acid, boron trifluoride, amphoteric metal chlorides, etc. Phosphoric acid ($H_3PO_4$) has been proposed as a polymerizing agent, for example in U. S. Patent No. 2,138,211. The phosphoric acid employed has been ordinary commercially available orthophosphoric acid of a concentration generally not exceeding 85% $H_3PO_4$, and never in excess of 100% $H_3PO_4$. The use of prior polymerizing agents is disadvantageous. Thus, sulfuric acid is dangerous to handle, corrosive, and violent in its action. The product prepared with sulfuric acid contains combined sulfur which is undesirable for many purposes, particularly for use in the presence of lead driers during varnish cooking. Boron trifluoride is highly corrosive, poisonous, and difficult to use. Orthophosphoric acid has not given a sufficient degree of polymerization. Thus, wood rosin does not appreciably polymerize when using orthophosphoric acid, although gum rosin may be polymerized to a moderate degree when employing this catalyst. The use of a metal halide such as aluminum chloride or stannic chloride as the catalyst leaves traces of metal halide-polymer complex in the product which is only removed with difficulty and at substantial expense.

It is an object of the present invention to devise an improved process for the polymerization of rosin and its esters. Another object is to increase the degree of polymerization of rosin and its esters over that previously obtained in the prior art using orthophosphoric acid. A further object is the polymerization of rosin and its esters to obtain a product free from the contaminating materials introduced by the previously used catalysts such as sulfuric acid, etc. Other objects will more fully hereinafter appear.

In accordance with the present invention these objects are accomplished by employing as the polymerizing agent for the rosin or rosin ester a material selected from the group consisting of phosphorus pentoxide and phosphoric acids containing more than 72.5% by weight of $P_2O_5$, the preferred polymerizing agent being the polyphosphoric acid known to the art as tetraphosphoric acid. If desired, mixtures of orthophosphoric acid and the previously mentioned phosphoric acids or of orthophosphoric acid and $P_2O_5$ may be employed as catalysts for the polymerization of rosin and rosin esters. The rosin or rosin ester is contacted with a polymerizing agent of the aforesaid group, such as tetraphosphoric acid, for a sufficient period of time and at a suitable temperature, in the presence or absence of an inert solvent for the rosin or rosin ester, until the desired degree of polymerization results. The catalyst is then separated from the reaction mixture and the polymerized rosin or rosin ester recovered for use.

As the raw material to be polymerized in accordance with the present invention, I may employ any form of rosin such as wood rosin, gum rosin, equivalent rosin acids such as pimaric acid, sapinic acid, abietic acid, pyroabietic acid, etc. I may employ rosin of pale or dark grade. Either l-pimaric acid or dextro-pimaric acid may be polymerized. I may polymerize rosins which have been refined with selective solvents such as furfural or the like, or selective adsorbents such as fuller's earth, activated clay, activated carbon and the like. I may polymerize either the mono or the polyhydric alcohol esters of the foregoing acidic rosin materials such as esters with methyl, ethyl, propyl, butyl, etc., alcohols, the glycols, glycerine, pentaerythritol, sorbitol, mannitol, etc.

As the polymerizing agent, I prefer to use tetraphosphoric acid. Tetraphosphoric acid is a commercially available commodity having a specific gravity of about 2.06 at 20° C. and containing from about 82% to about 84% $P_2O_5$ by weight. It is a substantially water-white viscous liquid which contains no water except that of chemical combination. Instead of tetraphosphoric acid, either the commercially available material or the chemically pure product, I may employ other polyphosphoric acids, preferably those which are liquid under ordinary conditions such as pyrophosphoric acid, triterohexaphosphoric acid, penterohexaphosphoric acid. I may employ metaphosphoric acid which is a transparent vitreous solid. Likewise, I may use hexerohexaphosphoric acid, decaphosphoric acid, octerohexaphosphoric acid, or ennerohexaphosphoric acid. Alternatively, I may employ phosphoric pentoxide which is a snow white pulverulent solid. The polyphosphoric acids enumerated are all characterized by a content of more than 72.5% by weight of $P_2O_5$. Varying amounts of orthophosphoric acid may be present in the catalyst. Also the catalysts may be mixed with orthophosphoric acid.

Preferably, a solvent for the material undergoing polymerization is present throughout the polymerization. Any suitable volatile organic solvent which is free from water, inert with respect to the polymerizing agent employed, and preferably immiscible with water, may be employed. Examples of suitable solvents are benzene, xylene, cyclohexane, decahydronaphthalene, etc. saturated petroleum hydrocarbons such as gasoline and hexane, etc., chlorinated solvents such as ethylene dichloride, chlorinated butane, monochlorobenzene, carbon tetrachloride, trichloroethylene, dichloroethyl ether, etc. The rosin or rosin ester is first dissolved in the solvent to a suitable concentration, ranging from about 10% to about 70% by weight of rosin or rosin ester. This solution is then contacted with the polymerizing agent such as tetraphosphoric acid for a period of time ranging from about ¼ to about 12 hours and preferably from about 1 to about 4 hours, at a temperature ranging from about 40° C. to about 200° C. and preferably from about 60° C. to about 120° C. Vigorous agitation is employed throughout. A convenient method is to reflux the reaction mixture throughout the polymerization.

The amount of catalyst employed may vary from about 1% to about 50% by weight based on the weight of rosin or rosin ester and preferably from about 5% to about 20%.

The reaction is carried out under substantially anhydrous conditions, that is in the absence of water other than that which is chemically combined with the polyphosphoric acid employed as polymerizing agent. Where $P_2O_5$ is used as the catalyst, a very small trace of water may be present to initiate the reaction. The trace of water usually found in the organic solvent used will be sufficient for this purpose.

The polymerization may be conducted either at atmospheric pressure or at an elevated pressure, varying up to about 100 atmospheres. Ordinarily, however, it will be preferred to carry out the polymerization at atmospheric pressure. It is preferred to maintain an inert atmosphere over the polymerizing mixture throughout the reaction. Thus, reaction in an inert atmosphere such as carbon dioxide, nitrogen or hydrogen facilitates the achievement of pale colored products.

Following the reaction period, the mixture is treated to recover therefrom the polymerized rosin or rosin ester free from catalyst and solvent. Thus, water may be introduced into the reaction mixture in amount sufficient to decompose the polymerized rosin-catalyst complex, or polymerized rosin ester-catalyst complex. Thereupon, the aqueous acid phase will be separated from the solvent phase, and the solvent phase washed to remove traces of acid. The washing may be carried out with either hot or cold water. The addition of small amounts of inorganic salts during the washing inhibits emulsification of the polymeric solution. Salts such as sodium chloride, sodium sulphate, borates, phosphates, etc. may be employed for this purpose. The concentration of salt in the wash water may vary from about 1% or less to about 15% or more, and preferably from about 2% to about 5%. Small amounts of alkalies may be added to the wash water if desired, ammonium carbonate being preferred for this purpose since the ammonium salt of polymerized rosin may be readily decomposed by moderate heating. Where alkalies are so used, care is necessary during the washing to insure that the aqueous alkali solution be so dilute, preferably from about 0.5% to about 1%, as to inhibit neutralization of the polymerized rosin.

Following the water wash, the solvent is removed from the solution by distillation, preferably under reduced pressure. Steam distillation may also be employed. The polymerized material may if desired be subjected to a steaming treatment following removal of solvent, at a temperature of from about 150° C. to about 300° C. The thus recovered polymer constitutes the product of the process.

The above process may if desired be somewhat modified. In the case of many solvents, for example gasoline and benzene, when operating at a concentration of from about 10% to about 50% of unpolymerized material, an appreciable amount of insoluble sludge is present in the reaction mixture. This sludge contains color bodies, and its removal prior to the treatment of the reaction mixture with water will often result in a lighter colored polymeric product, although since the sludge contains polymer, the procedure results in a somewhat reduced yield. The amount of sludge which forms is a function both of the rosin concentration and of the amount of catalyst employed. In general, as the concentration of raw material inceases, the amount of sludge decreases, and as the quantity of catalyst is increased, the quantity of sludge increases.

Polymerized rosin or rosin ester can be recovered from the so-separated sludge by treating the sludge with hot or cold water to decompose it, and then extracting the polymerized rosin or rosin ester from the decomposed mixture by means of a suitable volatile organic solvent, water washing the extract, and recovering polmer from the extract by evaporation of the solvent therefrom under reduced pressure. Instead of decomposing the sludge with water prior to the extraction, the sludge may be directly extracted with an oxygenated volatile organic solvent such as diethyl ether or diisopropyl ether, this solution then water washed and evaporated to recover the polymerized rosin or polymerized rosin ester contained therein.

In the case of many solvents such as for example gasoline, benzene, or carbon tetrachloride, either no sludge forms or, if any sludge does form, it is present in reduced quantities when using rosin or rosin ester concentrations above 50%. In such case, the reaction mixture is homogeneous or nearly so and it may be treated with water to decompose polymer-catalyst complexes, the solvent phase separated, washed with water, and evaporated under vacuum to recover the polymer. Under such circumstances, the amount of catalyst employed is of importance, since if it is used in too great amounts, apreciable sludge formation will occur in spite of the increased initial concentration.

If desired, the reaction mixture containing sludge may be diluted, prior to washing, with additional volatile organic solvent to facilitate separation of the sludge, followed by the steps above outlined for recovery of the polymeric material from the sludge and from the solvent phase.

Where the sludge is formed in only small amounts, its removal from the reaction mixture prior to the decomposition thereof with water is not essential, but it may be left in and decomposed by the water added. Upon decomposition of the sludge in this manner, the liberated polymer goes into solution in the solvent phase and is recovered therefrom along with the remaining polymer.

When employing certain solvents such as for example ethylene dichloride and dichloroethyl ether, sludge formation does not occur to an appreciable extent in the range of initial concentration of from about 10% to about 70%, the polymerized rosin or rosin ester-catalyst complex being substantially soluble in such solvents at these concentrations.

If desired, a non-solvent method of polymerization may be employed. For example, molten rosin or rosin ester may be agitated with the catalyst at temperatures ranging from the melting point of the raw material up to about 200° C. and preferably at temperatures ranging from about 75° C. to about 150° C. Following treatment in this manner for the desired period of time, the reaction mixture may be cooled somewhat, washed with water to decompose complexes present and to remove the catalyst therefrom. Preferably, hot water under pressure is employed for this purpose. Alternatively, the reaction mixture may be cooled somewhat and dissolved in any suitable volatile inert organic solvent such as any of those referred to above, the solution being commingled with water to dissolve polymer-catalyst complexes, the aqueous phase separated from the solution phase, the solution phase washed with water and then evaporated under reduced pressure to recover the polymeric material. If desired, any sludge present, following the dilution of the molten or cooled polymerization mixture may be removed prior to water washing of the solution.

In connection with any of the washing processes referred to above, emulsification during washing may be eliminated by subjecting the reaction mixture, with or without previous separation of any sludge formed, to hydrolysis prior to the water washing. In this way, any traces of polymerized rosin phosphates which are present and which act as emulsifying agents are decomposed. This hydrolysis may be accomplished by heating the reaction solution with water, or with aqueous solutions of inorganic acids or acid salts in the manner set forth in my copending application, Serial No. 371,990, filed Dec. 27, 1940.

The recovered polymerized rosin or rosin ester may, if desired, be heat treated in order to bleach its color. Heat treatment may be carried out at temperatures of from about 250° C. to about 350° C., preferably from about 275° C. to about 325° C., for a period of time of from about 5 minutes to about ½ hour or more, preferably from about 5 minutes to about 15 minutes. If desired, an inert atmosphere of carbon dioxide, nitrogen or hydrogen may be maintained during the heat treatment.

It is preferable to treat the polymerized material to remove light ends therefrom. Thus, the proportion of polymer in the polymerized rosin or rosin ester may be increased by means of vacuo distillation. In this way, oils and monomeric constituents may be distilled off, leaving the polymeric constituents as the residue. Thus, the light end including rosin oil present originally or formed during the polymerization may be removed and the melting point of the product greatly increased. If unpolymerized rosin ester which is sufficiently volatile to be distilled in vacuo be present, it likewise may be removed in this manner leaving the polymeric ester as the residue. Many rosin esters, however, are not sufficiently volatile to be distilled in vacuo. Removal of light end, that is oils and monomeric constituents in this manner increases the tack freedom of the product by removing the tack forming constituents.

The polymeric product may be refined to paler color products in any suitable manner as for example by selective solvents such as furfural, phenol, etc., selective adsorbents such as fuller's earth, activated clay, activated carbon and the like, precipitants such as stannic chloride, etc.

By reduced pressure distillation of the product, the effect of the decarboxylated rosin which forms during the polymerization and which imparts a low melting point to the product is largely overcome by the removal of the rosin oils formed by decarboxylation. Thus, when tetraphosphoric acid is employed as the catalyst, with K wood rosin, the resulting product has a melting point of 77° C. If, however, this product be vacuum distilled so as to remove up to about 40% of oils and light end, the residual polymerized rosin will have a drop melting point of about 106° C. In general, then, it is preferred to distill the polymeric material under reduced pressure to remove varying quantities, say up to about 40%, of light ends.

The polymerized rosin product is characterized by a content of at least about 60% of polymerized material having a melting point above 100° C., by freedom from sulfur, from phosphorus, and from heavy metals, and by an ash content of not more than 0.01% by weight. Production of a polymerized rosin of such purity has not heretofore been achieved. The polymerized rosin product obtained after reduced pressure distillation to remove substantially all of the light ends is characterized by the same properties and in addition by a melting point above 100° C.

It is preferred to use as polymerizing agent a polyphosphoric acid which is liquid at ordinary temperatures, such as pyrophosphoric acid, tetraphosphoric acid, so-called "phospholeum" which is commercial tetraphosphoric acid available from Monsanto Chemical Co., or the commercially available material available under the name "polyphosphoric acid" from, for example, Victor Chemical Works. Varying amounts of orthophosphoric acid may be present in these materials.

Below are given a number of specific examples showing typical methods of carrying out the process of the present invention. In examples, 1 to 6, the tetraphosphoric acid employed was commercial tetraphosphoric acid known as "phospholeum" and containing 82–84% $P_2O_5$.

*Example 1*

A solution of 200 g. of N wood rosin in 200 g. of toluene was agitated with 40 g. of tetraphosphoric acid under reflux at 90–100° C. for 4 hours. The reaction mixture was cooled, allowed to stand 15 minutes, and the toluene solution decanted from a small amount of viscous sludge.

In order to hydrolyze traces of polymerized rosin tetraphosphate in the reaction mixture, the toluene solution so separated was agitated under reflux at 90° C. with 400 g. aqueous 25% sulfuric acid for 1 hour. After separating the aqueous $H_2SO_4$, the toluene solution was water washed and the solvent removed by vacuum distillation using a final bath temperature of 220° C. 178 g. of polymerized rosin having an acid number of 158, a drop melting point of 93° C. and a color of D+ was obtained. The original rosin had an acid number of 164 and a drop melting point of 81° C.

Example 2

A solution of 200 g. of N wood rosin in 200 g. of toluene was agitated with 40 g. of tetraphosphoric acid under reflux at 90–100° C. for 4 hours. To the reaction mixture was added 200 g. of water. The mixture was refluxed at 90° C. for 1 hour. This caused hydrolysis of combined phosphates. After separating the aqueous acid layer, the toluene solution was water washed and the solvent evaporated under vacuum. 195 g. of product having an acid number of 163 and a drop melting point of 91° C. was obtained.

Example 3

Fifty g. of N wood rosin was agitated in the molten state with 0.3 g. of tetraphosphoric acid at 125° C. for 1 hour. The reaction mixture was diluted with 180 g. of toluene, the toluene layer separated from the acid layer and the sludge, water washed, and distilled under vacuum to remove the unpolymerized material and light ends. The product had an acid number of 165, a drop melting point of 87° C. and a color of G+.

Example 4

50 g. of K wood rosin was agitated in the molten state with 2 g. of tetraphosphoric acid at 125° C. for 1 hour. The mixture was then poured into 180 g. of toluene. A small amount of sludge separated. The toluene solution was decanted and washed with water. The sludge was separated from the acid phase, dissolved in acetone, and added to the toluene solution. The resulting solution was further washed with water and then evaporated to recover the product, which had an acid number of 132, a drop melting point of 77° C. and a color of F.

The product was distilled at 1 mm. pressure until about 30% of oils had been removed. The residual polymerized rosin had a drop melting point of 108° C. and a molecular weight (Rast) of 414. The original K wood rosin had a drop melting point of 81° C. and a molecular weight (Rast) of 320.

Example 5

Four hundred g. of WG gum rosin was dissolved in 225 g. of narrow range gasoline (boiling point range 200° F.–270° F.). The solution was agitated for 4 hours under reflux at 80–90° C. with 70 g. of tetraphosphoric acid. The reaction mixture was diluted with 515 g. of narrow range gasoline with agitation, cooled to room temperature, allowed to stand for 15 minutes whereupon the solution layer was decanted from the sludge. The solution layer was then divided into 2 parts.

The first half of the solution of reaction product was washed with 3 consecutive 1000 cc. portions of water at 75° C. After thorough agitation, the mixture was allowed to stand for 30 minutes to undergo layer formation. The upper layer constituted the gasoline solution. A curd formed during the washing which rendered the separation of the solution somewhat difficult. Following the final washing and separation, the solvent was evaporated to yield 165 g. of polymerized rosin having an acid number of 152, a drop melting point of 81° C., and a color of K+.

The other half of the gasoline solution of the reaction product was agitated for 1 hour at 80–90° C. under reflux with 400 g. of aqueous 25% sulfuric acid. After separation of the aqueous sulfuric acid, the solution was washed with water as previously, and the solvent evaporated to yield 165 g. of product having an acid number of 152, a drop melting point of 31° C., and a color of K+. The hydrolysis treatment prevented curd formation.

The total yield of the product was 82%. The product was vacuum distilled at 1 mm. pressure until 40% of oils and monomers distilled off. The residue had an acid number of 163 and a drop melting point of 100° C. The original WG gum rosin had an acid number of 164 and a drop melting point of 83° C.

Example 6

A solution of 100 g. of ester gum prepared from K wood rosin in 100 g. of benzene was agitated with 25 g. of tetraphosphoric acid under reflux at 85° C. for 3 hours. Two hundred g. of water was added to the reaction mixture and the mixture was agitated at 80–90° C. for 1 hour to hydrolyze combined phosphates. The aqueous acid layer was separated from the benzene solution. The solution was washed with water and evaporated under reduced pressure. The characteristics of the initial material and of the product are indicated in the following table:

|  | Original ester gum | Polymerized ester gum |
| --- | --- | --- |
| Acid number | 7 | 10 |
| Color | N | G |
| Drop melting point ° C | 90 | 110 |

Example 7

Twenty grams of $P_2O_5$ was added to a solution of 100 g. of K wood rosin in 200 g. of toluene. The reaction mixture was agitated for 1 hour under reflux, excluding moisture, at 110–120° C. The toluene solution was decanted from a small amount of sludge, and washed with warm water. The solvent was evaporated in vacuo, leaving the crude polymerized rosin as residue. The residue had an acid number of 154 and a drop melting point of 81° C.

The residue was subjected to vacuo distillation at 1 mm. pressure until 30% of oils and monomeric material distilled over. The residue had an acid number of 160, a drop melting point of 95° C., and a color of H.

Example 8

Twenty grams of pulverized metaphosphoric acid was added to a solution of 100 g. WG gum rosin in 60 g. narrow range gasoline (boiling range 90–120° C.). The reaction mixture was agitated for 1.5 hours at 90° C. The cooled reaction mixture was then diluted with an additional quantity of 350 g. narrow range gasoline with agitation. The solution, after separation by decantation from a small amount of sludge, was washed with warm water, and the solvent evaporated as previously. The crude polymerized rosin had an acid number of 155 and a drop melting point of 78° C.

The product was vacuo distilled at 1 mm. pressure until 25 g. of oil and monomer had distilled over. The residue had an acid number of 162, a drop melting point of 95° C., and a color of I.

Example 9

Thirty g. of pyrophosphoric acid was added to a solution of 150 g. of WG gum rosin in 100 g. of toluene. The mixture was agitated for one hour at 120° C., then cooled and diluted with 500 g. of toluene with agitation. The toluene solution was separated from a small amount of sludge, washed with warm water, and the solvent evaporated as previously. The residue had an acid number of 158 and a drop melting point of 83° C. Vacuum distillation at 1 mm. as previously until about 20% of oil and monomeric constituents distilled over, left a product having a melting point of 90° C., acid number of 164, and color of K.

From the foregoing, it will be seen that the use of tetraphosphoric acid, and similar polyphosphoric acids and phosphorus pentoxide as a catalyst for the polymerization of rosin and rosin esters is advantageous over prior methods of polymerizing such materials. It will further be seen that an effective polymerization is brought about without objectionable violence of reaction. It will further be seen that the product is readily freed from traces of catalyst, so that a product of high purity may be produced. In addition, it will be seen that the polymerization process described combined with the reduced pressure distillation of the product results in a product having an excellent melting point and other characteristics. Numerous other advantages of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. The process of polymerizing a material selected from the group consisting of rosin and rosin esters, which comprises subjecting said material at a temperature substantially within the range of from about 40° C. to about 200° C. to the action of a polymerizing agent selected from the group consisting of phosphorus pentoxide and polyphosphoric acids, and maintaining the material and polymerizing agent at said temperature for a sufficient length of time to effect polymerization of said material without substantial decomposition of the material.

2. The process of polymerizing a material selected from the group consisting or rosin and rosin esters, which comprises subjecting said material to the action of a polyphosphoric acid, at a temperature substantially within the range from about 40° C. to about 200° C. and maintaining the material and polyphosphoric acid at said temperature for a sufficient length of time to effect polymerization of said material without substantial decomposition of the material.

3. The process of polymerizing a material selected from the group consisting of rosin and rosin esters, which comprises subjecting said material to the action of tetraphosphoric acid, at a temperature substantially within the range from about 40° C. to about 200° C. and maintaining the material and tetraphosphoric acid at said temperature for a sufficient length of time to effect polymerization of said material without substantial decomposition of the material.

4. The process of polymerizing a material selected from the group consisting of rosin and rosin esters which comprises subjecting said material to the action of pyrophosphoric acid, at a temperature substantially within the range from about 40° C. to about 200° C. and maintaining the material and pyrophosphoric acid at said temperature for a sufficient length of time to effect polymerization of said material without substantial decomposition of the material.

5. The process of polymerizing a material selected from the group consisting of rosin and rosin esters which comprises subjecting said material to the action of metaphosphoric acid, at a temperature substantially within the range from about 40° C. to about 200° C. and maintaining the material and metaphosphoric acid at said temperature for a sufficient length of time to effect polymerization of said material without substantial decomposition of the material.

6. The process of polymerizing a material selected from the group consisting of rosin and rosin esters which comprises subjecting said material to the action of phosphorus pentoxide, at a temperature substantially within the range from about 40° C. to about 200° C. and maintaining the material and phosphorous pentoxide at said temperature for a sufficient length of time to effect polymerization of said material without substantial decomposition of the material.

7. The process of polymerizing a material selected from the group consisting of rosin and rosin esters, which comprises subjecting said material at a temperature substantially within the range of from about 40° C. to about 200° C. to the action of a polymerizing agent selected from the group consisting of phosphorus pentoxide and polyphosphoric acids and maintaining the material and agent at said temperature for a sufficient length of time to effect substantial polymerization of said material without substantial decomposition of the material, separating said polymerizing agent from the polymeric material, and distilling the polymeric material to remove unpolymerized material, rosin oil and other light ends.

8. The process of polymerizing a material selected from the group consisting of rosin and rosin esters, which comprises subjecting said material at a temperature substantially within the range of from about 40° C. to about 200° C. to the action of a polymerizing agent selected from the group consisting of phosphorus pentoxide and polyphosphoric acids, maintaining the material and agent at said temperature for a sufficient length of time to effect substantial polymerization of said material without substantial decomposition of the material, separating said polymerizing agent from the polymeric material, and distilling the polymeric material under reduced pressure to remove up to about 40% of light ends and to thereby substantially increase the purity, melting point and hardness of the polymeric material.

9. The process of polymerizing a material selected from the group consisting or rosin and rosin esters which comprises subjecting said material to the action of tetraphosphoric acid, at a temperature substantially within the range from about 40° C. to about 200° C. and maintaining the material and tetraphosphoric acid at said temperature for a sufficient length of time to effect polymerization of said material without substantial decomposition of the material, recovering the polymeric material from the reaction mixture, and distilling the polymeric material so recovered under reduced pressure to remove a substantial proportion of light ends therefrom.

10. The process which comprises contacting a solution of a material selected from the group consisting of rosin and rosin esters in an inert volatile water-immiscible organic solvent of a concentration of from about 10% to about 70% by weight with a polymerizing agent selected from the group consisting of phosphorus pentoxide and polyphosphoric acids, with vigorous agitation in the absence of water other than that of combination in the polymerizing agent, at a temperature of from about 40° C. to about 200° C. and maintaining the material and polymerizing agent at said temperature for a sufficient length of time to effect polymerization of said material without substantial decomposition of the material, the amount of polymerizing agent ranging from about 1% to about 50% by weight based on the weight of said material, adding water to the reaction mixture to decompose the polymer-reaction polymerizing agent complex, separating the solvent phase, washing the solvent phase with water, and recovering the polymeric material from the solvent phase by evaporation of the solvent therefrom.

11. The process of polymerizing a material selected from the group consisting of rosin and rosin esters which comprises subjecting said material to the action of a polymerizing agent selected from the group consisting of phosphorus pentoxide and polyphosphoric acids, said material being dissolved in an inert volatile water-immiscible organic solvent to a concentration of from about 10% to about 50% by weight, in the absence of water other than that of combination in the polymerizing agent, at a temperature of from about 40° C. to about 200° C. and maintaining the material and polymerizing agent at said temperature for a sufficient length of time to effect polymerization of said material without substantial decomposition of the material, the amount of polymerizing agent ranging from about 1% to about 50 by weight based on the weight of said material, separating a sludge formed from the reaction mixture, treating the separated sludge with water to decompose it, dissolving the polymer in the decomposed mixture in a volatile organic solvent, water washing the solution thus obtained, and evaporating the solvent from the washed solution to recover the polymer therefrom.

12. The process which comprises contacting a solution of a material selected from the group consisting of rosin and rosin esters in an inert volatile water-immiscible organic solvent of a concentration of from about 10% to about 50% by weight with a polymerizing agent selected from the group consisting of phosphorus pentoxide and polyphosphoric acids at a temperature substantially within the range from about 40° C. to about 200° C. and maintaining the material and polymerizing agent at said temperature for a period of time sufficient to bring about substantial polymerization of said material, diluting the reaction mixture with additional volatile organic solvent to facilitate separation of the sludge therefrom, separating the sludge from the mixture, treating the sludge with water to decompose it, dissolving the polymer thus formed in volatile organic solvent, water washing the solution thus formed, and evaporating the solvent to recover polymer therefrom.

13. The process of polymerizing rosin which comprises contacting a solution thereof in an inert volatile substantially water-immiscible organic solvent of a concentration of from about 10% to about 70% by weight with tetraphosphoric acid in the substantial absence of water other than that of combination in said acid, at a temperature of from about 60° C. to about 120° C., the amount of said acid ranging from about 5% to about 20% by weight based on the weight of rosin, for a period of time ranging from about 1 to about 4 hours, recovering polymerized material substantially free from acid, and distilling under reduced pressure the recovered material to remove light ends therefrom.

14. The process of polymerizing a material selected from the group consisting of rosin and rosin esters which comprises agitating said material in molten state at a temperature ranging from the melting point thereof up to about 200° C. with a polymerizing catalyst selected from the group consisting of phosphorus pentoxide and polyphosphoric acids for a period of time sufficient to effect substantial polymerization of said material, and recovering from the reaction mixture polymerized material substantially free from catalyst.

15. The process of polymerizing a material selected from the group consisting of rosin and rosin esters which comprises subjecting said material to the action of a polyphosphoric acid which is liquid under ordinary conditions at a temperature substantially within the range from about 40° C. to about 200° C. for a period of time sufficient to effect substantial polymerization of said material without substantial decomposition of the material.

16. The process of polymerizing rosin which comprises subjecting a solution thereof in a volatile inert water-immiscible organic solvent to the action of tetraphosphoric acid at a temperature substantially within the range from about 40° C. to about 200° C. and maintaining the rosin solution and tetraphosphoric acid at said temperature for a sufficient period of time to effect substantial polymerization of the rosin, treating the solution portion of the reaction mixture with dilute aqueous inorganic acid at an elevated temperature for a sufficient time to effect substantially complete hydrolysis of any addition product formed by combination of the tetraphosphoric acid with the rosin material, separating the aqueous acid phase from the solution phase, washing the solution phase with water to remove water-soluble impurities, and evaporating the solvent from the solution phase to recover the polymerized rosin.

ALFRED L. RUMMELSBURG.

CERTIFICATE OF CORRECTION.

Patent No. 2,310,374. February 9, 1943.

ALFRED L. RUMMELSBURG.

It is hereby certified that error appears in the printed specification of the above numbered patent requiring correction as follows: Page 4, second column, line 5, for "31° C." read --81° C.--; page 5, first column, line 48, for "or" read --of--; and that the said Letters Patent should be read with this correction therein that the same may conform to the record of the case in the Patent Office.

Signed and sealed this 16th day of March, A. D. 1943.

(Seal)
Henry Van Arsdale,
Acting Commissioner of Patents.